Dec. 20, 1966 TERUJI ISHII 3,292,419
MELTING POINT METHOD AND APPARATUS
Filed April 2, 1964

INVENTOR
Teruji Ishii
BY Paul M. Craig, Jr.
ATTORNEY

3,292,419
MELTING POINT METHOD AND APPARATUS
Teruji Ishii, Tokyo, Japan, assignor to Cobble-Laboratory
 & Co., Tokyo, Japan, a corporation of Japan
Filed Apr. 2, 1964, Ser. No. 356,911
Claims priority, application Japan, Apr. 4, 1963,
38/16,429
4 Claims. (Cl. 73—17)

This invention relates to an apparatus for determining and recording melting points of minute quantitative samples or specimens of minute quantities, and particularly to measurement of melting points, solidifying points, transition points, etc. of organic substances of minute amounts.

The primary object of the present invention is to provide a method and an apparatus of the kind specified which enable correct measurement of the thermal characteristics of organic minute specimens.

Another object of the present invention is to provide a method and an apparatus of the kind specified which utilize thermistors for measurement of temperatures.

Figure 1:
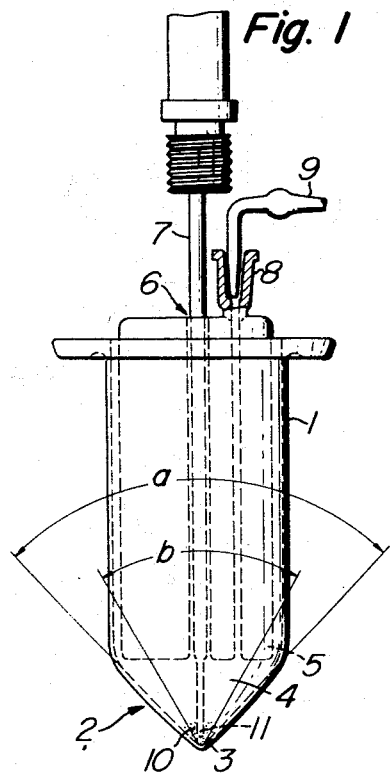
Figure 2:
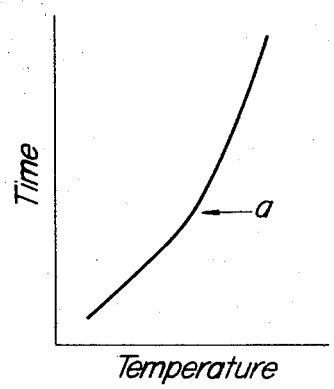
Figure 3:
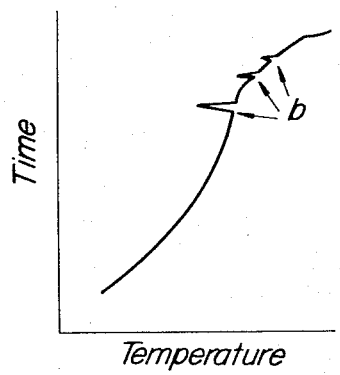
Figure 4:
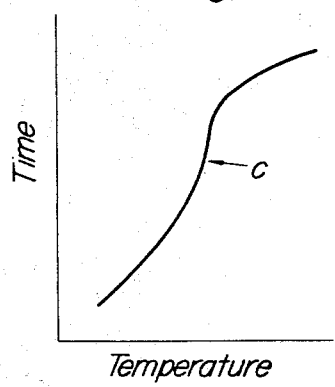

There are other objects and particularities of the present invention, which will be made obvious from the following detailed description of the invention, with reference to the accompanying drawings, in which:

FIG. 1 is a side elevational view of an apparatus embodying the present invention; and FIGS. 2, 3 and 4 are diagrams respectively showing fusion curves under various conditions.

In measuring thermal characteristics of minute-specimens, platinum-resistor thermometers, thermo-pile thermometers, etc. have heretobefore been utilized, but the operations of measurement utilizing them are of complex procedures necessitating use of relatively large amounts of specimens. The apparatus themselves also are of complex constructions and high costs. Moreover, there are required long periods of times for completing the measurements.

According to the present invention, thermistors are utilized for measurement of temperatures, with their heat sensitive portions, or bead portions, embedded within minute specimens, for correct and prompt measurement of thermal characteristics of the minute-specimens themselves.

In employing a thermistor as above-mentioned, the minute-specimen and the bead portion of the thermistor should be held in close contact with each other within a charge chamber in which the specimen is fused or solidified for causing phase change of the specimen by heating or cooling, whereby the bead portion of the thermistor is caused to sense absorption or release of heat energy for sending electric signals to a registor device. In this case, the bead portion of the thermistor must always be kept placed in the central portion of the specimen. If the bead portion be exposed even partly out of the specimen, or be in contact with the wall of the charge chamber, a correct fusing or solidifying curve cannot be obtained. The fusion of the specimen when heated proceeds gradually from near the wall of the charge chamber to the central portion thereof, and the charge chamber must have such a shape that the specimen does not adhere to the thermistor, but keeps contact with the wall of the charge chamber at the beginning of fusion. If the specimen should be out of contact with the wall of the charge chamber, correct measurement would be impossible. Further, the specimen during fusion should not be moved out of contact with the bead portion of the thermistor by capillary action or air pressure. Care must also be taken to assure that a part of the specimen does not adhere to the portion of the thermistor above the bead portion, and such a part of the specimen must never fall into the melt after the specimen in the charge chamber has been fused. Otherwise, the falling specimen would cause abrupt changes in the fusion curve, resulting in an incorrect fusion curve.

The above-mentioned undesirable states of fusion are shown in FIGS. 2 and 3. In FIG. 2, a time-temperature curve is shown making clear that the specimen has moved out of contact with the bead portion of the thermistor at point $a$. This curve has nearly even radius of curvature, making it difficult or impossible to confirm the starting and finishing points of fusion. FIG. 3 shows a time-temperature curve obtained when minute crystals of the specimen adhering to the wall of the container or the portion of the thermistor above the bead portion have fallen into the melt of specimen in the charge chamber during fusion, particularly at the finishing period. The portions $b$ of the curve show the effects of such falling surplus specimen substance, making it impossible to determine the correct fusing point of the specimen. In addition, when the specimen is sublimative, it is necessary to keep the sublimated loss minimum.

On the other hand, in order to obtain uniform distribution of heat throughout the specimen in the charge chamber as far as possible, in measuring heat characteristics of specimen organic specimen, the amount of specimen should be minute as far as possible. Particularly when the specimen is a rare one, the amount of specimen usable is necessarily so minute that correct measurement is very difficult. In practice, a usable amount of specimen is as minute as 5 mg. to 30 mg. in powdered form, and for fusing such a minute amount of specimen, the above-enumerated many conditions should be satisfied. Otherwise, a correct and comprehensive thermal characteristic curve would not be obtained. It is also desirable that the volume of the specimen does not change appreciably before and after the phase change such as fusion or solidification. However, there takes place practically a volume change along with the phase change, whereby complete contact of the specimen and the bead portion of the thermistor with each other becomes impossible to maintain. According to the present invention, however, such a complete contact is made possible by additional use of suitable particles of material to be described.

In general, organic substances are poor in heat conductivity, and the distribution of heat throughout the organic specimen is ordinarily not uniform, resulting in uneven fusion or solidification, and hence there is required a considerable period of time for the specimen to reach complete liquefaction or solidification. Consequently, there exists inevitably a time delay with respect to a definite rate of temperature rise or drop, causing errors in the result of measurement.

In order to eliminate the above-mentioned faults and disadvantages, the present invention contemplates the use of additive materials of particle form, which are refined or finely washed, stable against heat, completely inactive to organic materials, good in heat conductivity, and having no or little adsorptive nature, for increasing the whole volumetric amount of specimen under measurement sufficiently, so that the bead portion of the thermistor never comes out of contact with the specimen, and also for increasing the heat conductivity of the specimen as a whole, thus enabling correct measurement of heat characteristics of micro-specimen. Thus, according to the present invention, by increasing the volumetric amount of minute-specimen by commingling or mixing therewith other heat conductive materials of particle form, the heat distribution is made uniform throughout the specimen under measurement, whereby all the crystals of the specimen are collapsed within the charge chamber evenly, without leaving any piece of specimen crystallized on the inner wall of the container or on any portion of the thermistor above its bead portion. Particularly when crystals of the specimen are of light weight, they are apt to remain unfused at the melting temperature, but according to the present invention, proper and effective measurement is accomplished. In addition, when particles of other materials have been added to the specimen powder, the charging of the same into the charge chamber is extremely easy to effect. The commingled materials may merely be dropped into a feeding tube leading to the charge chamber, and the feeding tube and the charge chamber may merely be tapped in order to collect the whole specimen at the centre of the charging chamber. By such a simple charging operation, it is prevented substantially that the specimen material adheres to the thermistor at the beginning of fusion or moves out of contact with the wall of the charge chamber, or that specimen crystal pieces fall into the melt at the end of fusion.

Particle materials suitable for use as the additives should have the following properties; stability against heat, non-reactivity to organic materials (any change in organic specimen or affection of purity of the same should be inhibited), no or little adsorptive nature, good heat conductivity, and specific weight larger than that of the organic specimen. In addition, the surface of the particle must be capable of being washed finely with mineral acid, and it must be insoluble in water and any solvents. Particles having such properties can be recovered after completion of measurement, if required, and their consumption may be kept at a minimum.

Particle materials having the above-mentioned properties may be, for example, gold, platinum, quartz, glass of low alkali solubisity, sea sand, etc. Suitable particle size thereof may be about 100 to 200 meshes.

The apparatus for carrying out the present invention may comprise a charge chamber formed by a refractory glass, such as Pyrex glass, in a cylindrical form, with the lower end closed and the lower portion having V-shaped longitudinal cross-section. The lower end of the charge chamber should be of about 60-degree divergent angle to form a specimen space, continued by the adjacent portion of about 90-degree divergent angle.

Further in the apparatus, a guide is provided for easy insertion of the bead portion of a thermistor, and is formed by a refractory glass having the outer side wall coincident with the inside cylindrical wall face of the charge chamber. The guide has a central bore for insertion thereinto of a thermistor which is inserted into the central bore from the top opening. If the length of insertion of the thermistor is predetermined, its bead portion can be positioned properly in the specimen space.

Referring to FIG. 1 of the drawings, the charge chamber comprises a cylindrical body portion 1 of refractory glass, and a continuous conical portion 2 formed by a specimen space 3 and an adjacent upper space 4.

The upper space 4 has a divergent angle $a$ of about 90 degrees, while the specimen space 3 has a divergent angle $b$ of about 60 degrees, as described hereinabove. A guide 5 of refractory glass is inserted into the cylindrical body portion 1. The guide 5 is provided with a central bore 6 through which a thermistor 7 may be inserted. In order to establish inert atmosphere in the specimen space, a gas feed pipe 9 may be connected with an upright tube 8 provided on the guide 5, and communicating with the specimen space. The inert gas may be nitrogen, for example.

The mixture of powder specimen and additive particles 10 is charged as illustrated in the specimen space 3, and the bead portion 11 of a thermistor is inserted through the bore 6 to the proper position in the specimen space 3. There is no such gap between the thermistor bead portion 11 and the inner wall surface of specimen space 3 that may cause capillary action, and there is no such fear that a small portion of the specimen left on the inner wall surface would fall into the main body of specimen after commencement of fusion, resulting in incorrect measurement. When the charge chamber is so positioned that the lower portion of the same including the whole conical portion immersed into a melting bath of a constant temperature, the specimen in the specimen space is evenly fused promptly from outside, and the whole specimen collapses into the specimen space 3, so that correct measurement can be accomplished.

*Example*

Particles of Pyrex glass (ca. 100 mesh) were finely washed sufficiently with chronic sulphate and refined water, dried sufficiently, and added to the specimen powder of phenacetin at a proportion of about 3 to 1, and sufficiently mixed therewith. The amount of the mixture was 20 mg. This specimen mixture was poured into the apparatus as shown in FIG. 1, and the measurement was effected. The melting point and the solidifying point of the specimen measured as above were quite coincident with those measured by conventional complex procedure within the range of allowable measurement error. The time-temperature curve obtained in this experiment is shown in FIG. 4, in which the melting point of the specimen is clearly shown at point C.

What is claimed is:

1. A method of measuring the melting point temperature of an organic micro-sample, comprising adding an amount of inorganic particles to said organic sample to increase the volume thereof and mixing said particles and sample, said inorganic particles being thermally stable, being unreactive to organic material, having good thermal conductivity, and being of non or poor adsorptive nature, heating the mixture of said particles and sample to cause melting of said sample, and measuring the temperature of said mixture.

2. An apparatus for measuring the melting point temperature of an organic micro-sample, comprising a glass vessel having a lower conical portion, the tip portion of said lower conical portion forming a sample chamber adapted to be heated from outside, the angle of spread of the inner wall of said conical portion being substantially 90°, the angle of spread of the inner wall of said sample chamber being substantially 60°, a thermistor probe, and a stopper having a first bore for receiving an inert gas, said stopper having a second bore so positioned that said thermistor is inserted into the sample chamber.

3. An apparatus for measuring the heat characteristics of an organic minute-specimen, comprising a container of refractory glass having a specimen space at the lower end, and a cylindrical guide member inserted into said container, said guide member having a through bore for insertion therethrough of a thermistor and another through bore extending centrally of said cylindrical guide member for supply of inert gas into said specimen space, the lower end of said first-named through bore being spaced directly above said specimen space said container consisting of an upper cylindrical portion into which said guide member is inserted, and a lower conical portion, the lower end of said lower conical portion forming said specimen space, said first-named through bore being substantially coaxial with said upper cylindrical portion, the length of said cylindrical guide member being at least as great as that of said cylindrical portion.

4. An apparatus according to claim 3, wherein the angle of conicity of said lower conical portion is substantially 60°.

References Cited by the Examiner

UNITED STATES PATENTS

| | | | |
|---|---|---|---|
| 2,252,750 | 8/1941 | Basch | 73—17 |
| 2,658,383 | 11/1953 | Chipley | 73—17 |
| 3,173,288 | 3/1965 | Davis et al. | 73—17 |
| 3,200,635 | 8/1965 | McDaniel | 73—17 |

RICHARD C. QUEISSER, *Primary Examiner.*

J.C. GOLDSTEIN, *Assistant Examiner.*